(12) United States Patent
Bickham et al.

(10) Patent No.: US 11,067,744 B2
(45) Date of Patent: Jul. 20, 2021

(54) LOW BEND LOSS OPTICAL FIBER WITH STEP INDEX CORE

(71) Applicant: Corning Incorporated, Corning, NY (US)

(72) Inventors: Scott Robertson Bickham, Corning, NY (US); Dana Craig Bookbinder, Corning, NY (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/193,919

(22) Filed: Nov. 16, 2018

(65) Prior Publication Data

US 2020/0158945 A1 May 21, 2020

Related U.S. Application Data

(60) Provisional application No. 62/592,689, filed on Nov. 30, 2017.

(51) Int. Cl.
*G02B 6/028* (2006.01)
*G02B 6/02* (2006.01)
*G02B 6/036* (2006.01)

(52) U.S. Cl.
CPC ....... *G02B 6/0288* (2013.01); *G02B 6/03616* (2013.01)

(58) Field of Classification Search
CPC .......................... G02B 6/0288; G02B 6/03616

USPC .................................................. 385/123–128
See application file for complete search history.

(56) References Cited

U.S. PATENT DOCUMENTS

| 5,079,433 A | 1/1992 | Smith |
| 5,410,567 A | 4/1995 | Brundage et al. |
| 6,027,062 A | 2/2000 | Bacon et al. |

(Continued)

FOREIGN PATENT DOCUMENTS

EP 0479120 A2 4/1992

*Primary Examiner* — Kaveh C Kianni
*Assistant Examiner* — Hung Q Lam
(74) *Attorney, Agent, or Firm* — Smit Kapadia

(57) ABSTRACT

A single mode optical fiber, comprising: (i) a silica based core having a step refractive index profile with an alpha of greater than 10, a relative refractive index $\Delta_{1MAX}$, and an outer radius $r_1$, wherein 6.25 microns>$r_1$≥4.75 microns, the core further comprising Cl, Ge, or a combination thereof; (ii) a first cladding region in contact with and surrounding the core, the first cladding region having a relative refractive index $\Delta_{2MIN}$, an inner radius $r_1$, and an outer radius $r_2$, wherein $r_2$<20 microns; and (iii) an outer cladding region surrounding the first cladding region, the outer cladding region having a relative refractive index $\Delta_3$. The fiber<1300 nm, a 22m cable cutoff wavelength<1260 nm; and a bend loss<0.005 dB/turn when the optical fiber is bent around a 30 mm mandrel; <0.5 dB/turn when the fiber is bent around a 20 mm mandrel.

22 Claims, 1 Drawing Sheet

(56) References Cited

U.S. PATENT DOCUMENTS

| | | | |
|---|---|---|---|
| 7,164,835 B2 * | 1/2007 | Matsuo | G02B 6/02009 |
| | | | 385/123 |
| 7,254,305 B2 | 8/2007 | Mishra | |
| 7,565,820 B2 | 7/2009 | Foster et al. | |
| 7,832,675 B2 | 11/2010 | Bumgarner et al. | |
| 8,891,925 B2 | 11/2014 | Bickham et al. | |
| 8,953,917 B2 | 2/2015 | Berkey et al. | |
| 9,442,012 B2 | 9/2016 | Mann et al. | |
| 9,580,350 B2 | 2/2017 | Annamalai et al. | |
| 9,618,692 B2 | 4/2017 | Berkey et al. | |
| 9,995,874 B2 * | 6/2018 | Bookbinder | G02B 6/02395 |
| 10,094,975 B2 | 10/2018 | Bookbinder et al. | |
| 2010/0310219 A1 * | 12/2010 | Bookbinder | C03B 37/01446 |
| | | | 385/123 |
| 2011/0064368 A1 * | 3/2011 | Bookbinder | G02B 6/0365 |
| | | | 385/123 |
| 2011/0229101 A1 * | 9/2011 | de Montmorillon | |
| | | | G02B 6/0281 |
| | | | 385/124 |
| 2013/0136406 A1 * | 5/2013 | Bookbinder | G02B 6/028 |
| | | | 385/124 |
| 2016/0216442 A1 | 7/2016 | Bookbinder et al. | |
| 2016/0245698 A1 | 8/2016 | Pau et al. | |
| 2016/0304392 A1 * | 10/2016 | Bookbinder | C03B 37/01446 |

\* cited by examiner

LOW BEND LOSS OPTICAL FIBER WITH STEP INDEX CORE

CROSS-REFERENCE TO RELATED APPLICATIONS

This application claims the benefit of priority under 35 U.S.C. § 119 of U.S. Provisional Application No. 62/592,689, filed Nov. 30, 2017, the content of which is incorporated herein by reference in its entirety.

BACKGROUND

The disclosure generally relates to low cost, low attenuation optical fibers and, more particularly, relates to optical fiber designs with mode field diameter (MFD) greater than 9 microns and low macrobend loss.

Low attenuation is an important characteristic of standard single mode optical transmission fibers configured to efficiently transmit data over large distances. Such single mode optical fibers are compliant with G.657.A1 and G652 specifications.

Optical fibers for jumper cables and laser pigtail application should be compatible to the optical transmission fibers, and need to be capable of directly coupling to the transmission fibers. Such fibers should have relatively low attenuation values (e.g., a attenuation value of <0.19 dB/km) and good macro bend performance.

SUMMARY

According to one embodiment a single mode optical fiber comprises:

a silica based core having a step refractive index profile with an alpha of greater than 10, a relative refractive index $\Delta_{1MAX}$, and an outer radius $r_1$, wherein 6.25 microns>$r_1$≥4.75 microns, the core further comprising Cl, Ge, or a combination thereof;

a first cladding region in contact with and surrounding the core, the first cladding region having a relative refractive index $\Delta_{2MIN}$, an inner radius $r_1$, and an outer radius $r_2$, wherein $r_2$<20 microns; and an outer cladding region surrounding the first cladding region, the outer cladding region having a relative refractive index $\Delta_3$, the fiber having MFD at a 1310 nm wavelength that is greater than 9 microns, a zero dispersion wavelength of less than 1300 nm; a 22 m cable cutoff wavelength of less than 1260 nm; and a bend loss of less than 0.005 dB/turn when the optical fiber is bent around a 30 mm diameter mandrel; and less than <0.5 dB/turn when the fiber is bent around a 20 mm diameter mandrel.

According to some embodiments the zero dispersion wavelength is greater than 1270 nm and less than 1300 nm.

According to some embodiments the bend loss is less than 0.001 dB/turn, and in some embodiments not greater than 0.0005 dB/turn, when the fiber bent around a 30 mm diameter mandrel.

According to some embodiments the bend loss is less than 0.02 dB/turn, and in some embodiments not greater than 0.01 dB/turn, when the fiber bent around a 20 mm diameter mandrel.

According to some embodiments 9.6 microns>MFD>9 microns. According to some embodiments 9.4 microns>MFD>9 microns.

According to some alpha (α) is greater than 12 and less than 100. According to some embodiments alpha (a) is between 15 and 25.

According to some embodiments 0.2%≥$\Delta_3$−$\Delta_{2MIN}$≥0.05%. According to some embodiments 0.2%≥$\Delta_3$−$\Delta_{2MIN}$>0.08%. According to some embodiments 0.15%≥$\Delta_3$−$\Delta_{2MIN}$≥0.08%. According to some embodiments 0.15%≥$\Delta_3$−$\Delta_{2MIN}$≥0.05%. According to some embodiments 0.125%≥$\Delta_3$−$\Delta_{2MIN}$≥0.05%.

According to some embodiments $r_2$<15 microns. According to some embodiments the first cladding region comprises moat volume V2, wherein 5% micron²<$V_2$<60% micron². According to some embodiments the first cladding region comprises moat volume $V_2$, wherein 5% micron²<$V_2$<40% micron². According to some embodiments the first cladding region comprises moat volume $V_2$, wherein 5% micron²<$V_2$<30% micron². According to some embodiments 5% micron²<$V_2$<20% micron². According to some embodiments 7% micron²<$V_2$<20% micron²

According to one embodiment a single mode optical fiber comprises:

a silica based core having a step refractive index profile with an alpha of less than 5, a relative refractive index $\Delta_{1MAX}$, and an outer radius $r_1$, wherein 7.5 microns>$r_1$≥6.5 microns, the core further comprising Cl, Ge, or a combination thereof;

a first cladding region in contact with and surrounding the core, the first cladding region having a relative refractive index $\Delta_{2MIN}$ an inner radius $r_1$, an outer radius $r_2$, wherein $r_2$<15 microns and volume $V_2$ between 7% micron² and 20% micron²; and an outer cladding region surrounding the first cladding region, the outer cladding region having a relative refractive index $\Delta_3$, such that 0.15%≥$\Delta_3$−$\Delta_{2MIN}$≥0.05% said fiber having MFD at 1310 nm wavelength between 9 and 9.6 microns, a zero dispersion wavelength of less than 1300 nm; a 22 m cable cutoff wavelength of less than 1260 nm; and a macro bend losses of less than 0.05 dB/turn when the optical fiber is bent around a 30 mm mandrel; less than <0.5 dB/turn when the fiber is bent around a 20 mm mandrel.

Some of the advantages of the embodiments of the optical fibers described herein are very low bend losses and have mode field diameters (MFDs) matched to standard single mode transmission fibers.

According to some embodiments the optical fibers exhibit macrobend losses of less than 0.002 dB/turn when the optical fiber is bent around a 30 mm mandrel and less than <0.2 dB/turn when the fiber is bent around a 20 mm mandrel. According to some embodiments the optical fibers exhibit macrobend losses of less than 0.001 dB/turn when the optical fiber is bent around a 30 mm mandrel; less than <0.15 dB/turn when the fiber is bent around a 20 mm mandrel. According to some embodiments the optical fibers exhibit macrobend losses of less than 0.001 dB/turn when the optical fiber is bent around a 30 mm mandrel; less than <0.12 dB/turn when the fiber is bent around a 20 mm mandrel. According to some embodiments the optical fibers exhibit macrobend losses of between 0.0001 dB/turn and 0.001 dB/turn when the optical fiber is bent around a 30 mm mandrel; and between 0.05 dB/turn and 0.12 dB/turn when the fiber is bent around a 20 mm mandrel. According to some embodiments the optical fibers have attenuation less than 0.19 dB/km at a 1550 nm wavelength, e.g., 0.175 dB/km to 0.185 dB/km at the 1550 nm wavelength.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawing(s) illustrate one or more embodiments, and together with the description serve to explain principles and operation of the various embodiments.

DETAILED DESCRIPTION

Figure 1:
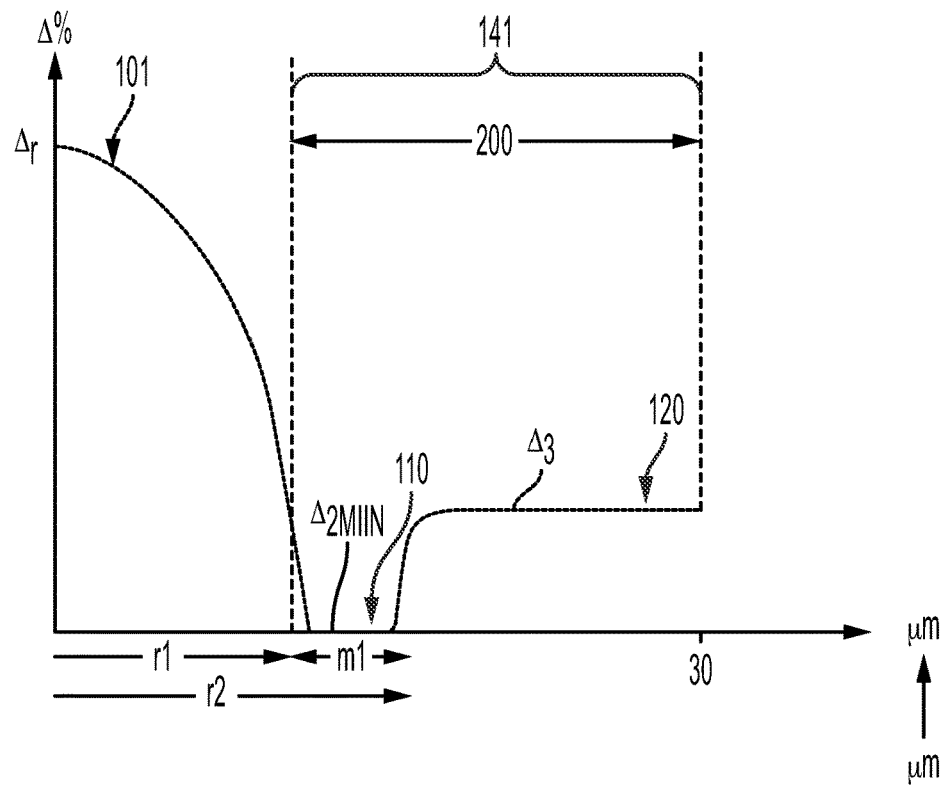
FIG. 1 schematically depicts a relative refractive index as a function of fiber radius of one exemplary embodiment of the optical fiber described herein.

Reference will now be made in detail to the present preferred embodiments, examples of which are illustrated in the accompanying drawings. Whenever possible, the same reference numerals will be used throughout the drawings to refer to the same or like parts.

The "refractive index profile" is the relationship between refractive index or relative refractive index and fiber radius.

The terms "μm" and "micron" are used interchangeably herein.

The "relative refractive index percent" (also referred to as the relative refractive index herein) is defined in Equation (1) below as:

$$\Delta\% = 100 \times (n_i^2 - n_c^2)/2n_i^2 \quad (1)$$

where $n_c$ is the minimum refractive index of the first cladding region and $n_i$ is the average refractive index at point i in the particular region of the optical fiber.

As further used herein, the relative refractive index is represented by $\Delta$ and its values are given in units of "%", unless otherwise specified. The terms $\Delta$, % $\Delta$, $\Delta\%$, delta index, percent index, percent delta index and % can be used interchangeably herein. In cases where the refractive index of a region is less than the refractive index of undoped silica, the relative index percent is negative and is referred to as having a depressed region or depressed index relative to silica. In cases where the refractive index is greater than the refractive index of undoped silica, the relative index percent is positive. An "up-dopant" is herein considered to be a dopant which has a propensity to raise the refractive index relative to pure undoped silica. A "down-dopant" is herein considered to be a dopant which has a propensity to lower the refractive index relative to pure undoped silica. Examples of up-dopants include $GeO_2$, $Al_2O_3$, $P_2O_5$, $TiO_2$, Cl, and Br. Examples of down-dopants include F and B.

"Chromatic dispersion," herein referred to as "dispersion" unless otherwise noted, of an optical fiber is the sum of the material dispersion and the waveguide dispersion. Zero dispersion wavelength is a wavelength at which the dispersion has a value of zero. Dispersion slope is the rate of change of dispersion with respect to wavelength.

"Effective area" is defined in Equation (2) as follows:

$$A_{eff} = 2\pi \left[ \frac{\left( \int f^2 r dr \right)^2}{\int f^4 r dr} \right] \quad (2)$$

where the integration limits are 0 to ∞, f is the transverse component of the electric field associated with light propagated in the waveguide (i.e., optical fiber), and r is the radius of the fiber. As used herein, "effective area" or "$A_{eff}$" refers to optical effective area at a wavelength of 1550 nm (i.e., the fundamental mode) unless otherwise noted.

The term "alpha" or "α-profile" refers to a relative refractive index profile, expressed in terms of $\Delta(r)$. $\Delta(r)$ is in units of "%," where r is radius, and follows Equation (3) as follows:

$$\Delta(r) = \Delta_{1max}\left[1 - \left(\frac{r}{r_1}\right)^\alpha\right] \quad (3)$$

where $\Delta_{1max}$ is the peak refractive index change in the center of the fiber (i.e., core delta), and $r_1$ is the core radius. Alpha as reported herein is measured at 1550 nm. An α=1 corresponds to a triangular relative refractive index profile, an α of 1.5<α<5 corresponds to a strongly step index profile, where an α=2 describes a parabolic profile, and α>12 corresponds to a profile approaching a step index (i.e., a "step-like index profile" as used herein) profile. The mode field diameter (MFD) is measured using the Peterman II method as understood in the field of this disclosure according to Equation (4) as follows:

$$MFD = 2w; \text{ and}$$

$$w^2 = 2\frac{\int f^2 r dr}{\int \left(\frac{df}{dr}\right)^2 r dr} \quad (4)$$

where w is the mode field radius, and the integral limits are 0 to ∞.

$V_2$ is the volume (i.e., the relative refractive index volume of the first cladding region, also referred to as moat volume herein) of the first cladding region. $V_2$ is defined by the following relation:

$$V_2 = \int_{r_1}^{r_2} |\Delta_{2-3}| r dr$$

wherein $\Delta_{2-3}$ is the difference between the relative refractive index between the first cladding region and the outer cladding region (and since $\Delta(r)$ is in units of "%, $\Delta_{2-3}$ is also in units of %). The units for $V_2$ are % μm$^2$.

A "cable cutoff measurement," as used herein, is performed using the standard 22 m test described in EIA-455-170 Cable Cutoff Wavelength of Single-mode Fiber by Transmitted Power, or "FOTP-170."

Low attenuation levels can be obtained with the optical fibers according to aspects of the disclosure. In particular, the exemplary optical fiber embodiments described herein have attenuation levels at 1550 nm of less than about 0.19 dB/km and, in some embodiments, less than about 0.185 dB/km (e.g., 0.179 dB/km-0.182 dB/km).

It is preferred that the fibers of this disclosure have an outer cladding diameter of between about 80 microns and about 150 microns. In some aspects, the optical fibers may have an outer cladding diameter of between about 120 microns and about 130 microns. Certain preferred embodiments of the fibers have an outer cladding diameter of about 125 microns.

Preferably, the embodiments of the optical fibers 100 described herein have cores that can possess a step refractive index profile with an alpha less than 5, or less than about 3 in some cases. A step refractive index core with an alpha less than 5 helps in reducing the small angle scattering contribution to the optical fiber attenuation. A step refractive index core also allows for the optical fiber to be manufactured in a reduced number of steps and lower manufacturing cost. The reduced number of process steps and manufacturing cost is achieved for a step refractive index core profile, and the optical fiber exhibit very low bend losses when wrapped around 20 mm and 30 mm diameter mandrels. In some embodiments the cores of these fibers can possess a step refractive index profile with an alpha between example between 10 and 100, between 12 and 50, or between 12 and 30, or between 15 and 25. According to some embodiments the fiber comprises germania or and chlorine doped core to provide the step index. Optionally, $K_2O$ and/or $P_2O_5$ dopants may be introduced in the core for added optical performance benefits. According to some embodiments the fiber comprises a cladding surrounding the core, the cladding comprising a first cladding region situated in contact with the core and surrounded by the outer cladding region. The first cladding region may comprise, for example, silica or silica down doped with fluorine.

The alpha profile in the step index core can be achieved using various methods such as outside vapor deposition (OVD) and vapor-phase axial deposition (VAD) methods. A second approach relies on a modified chemical vapor deposition (MCVD) approach. A third approach relies on a plasma-assisted chemical vapor deposition (PCVD) approach. In MCVD and PCVD approaches, the optical fiber core is made by layer-by-layer glass deposition, and the processes used to dope each layer can be independently controlled.

According to some embodiments, in an OVD or VAD soot to glass process, the step index refractive index profile is achieved by doping the core with either germania or chlorine precursor (e.g., $SOCl_2$, $SiCl_4$) during the preform consolidation and/or doping step of the optical fiber preform manufacturing. A silica soot core preform is made, for example, using the OVD or VAD silica soot deposition process. However, the soot preform for making optical fiber can be manufactured also by other methods.

In certain aspects of the methods for making the optical fibers disclosed herein, high soot surface area preforms (i.e., as compared to preform surface areas used in conventional optical fiber processing) can be employed for doping the core. In some embodiments, the surface area of the soot preform is larger than 10 $m^2/gm$, larger than 20 $m^2/gm$, larger than 25 $m^2/gm$, or even larger than 50 $m^2/gm$. In certain other embodiments, the surface area of the soot preform can be larger than 90 $m^2/gm$. In the embodiments described herein the soot is silica soot. The surface area of the soot preform can be measured using Brunauer-Emmett-Teller (BET) surface area characterization techniques, as understood within the operative field of the disclosure. According to one embodiment the soot preform has a density is about 0.5 $g/cm^3$ (e.g. 0.4-0.6 $g/cm^3$) and it is prepared in a lathe by flame depositing silica soot onto a 10 mm diameter removable alumina rotating bait rod comprising a silica handle.

In the first step of making of an optical preform, a silica soot preform is treated with a dehydration agent (for example, chlorine, $SOCl_2$, $SiCl_4$, or CO) to remove the water and metal impurities. The dehydration step is performed by exposing the preform to a temperature of between 900° C. and 1300° C.

According to some embodiments a method for making an optical fiber comprises the steps of:

(i) doping the silica core with germania or chlorine during the deposition or laydown step to make the soot core preform.

(ii) consolidating the soot core preform to make a consolidated seed free glass core preform (also refereed herein as the consolidated glass core preform);

(iii) depositing silica soot layer on the glass core preform and consolidating the silica soot layer to form the preform having the core and an inner cladding region;

(iv) overcladding the consolidated glass core preform with an inner cladding region with silica soot to form the overclad soot layer of the optical fiber preform (v) doping the overclad soot layer with chlorine by exposing the soot layer to chlorine dopant precursor at a temperature between 1000° C. and 1400° C.;

(vi) consolidating or sintering the chlorine doped soot layer at temperatures between 1300° C. and 1500° C. for at least 30 minutes to form the seed free glass overclad layer and the consolidated optical fiber glass preform;

(vii) drawing the optical fiber from the consolidated optical fiber glass.

In some embodiments, the silica soot of the inner cladding region is doped with fluorine to form a depressed index inner cladding region. In still other embodiments, the core and the inner cladding regions are deposited in a single step and the consolidation of the core and the inner cladding region is performed in a single step.

The optical fibers described herein may be fabricated with drawing processes having a draw tension of about less than 90 g. Preferably, the draw tension is set at less than about 45 g, and more preferably, set between about 30 g and about 45 g. Fibers that are formed with these processing parameters are even less susceptible to draw-induced stresses that can be detrimental to the optical transmission properties of the fiber, including waveguide propagation performance.

The fibers disclosed herein, including fibers 100, may be drawn from optical fiber preforms made using conventional manufacturing techniques and using known fiber draw methods and apparatus, for example as are disclosed in U.S. Pat. Nos. 7,565,820, 5,410,567, 7,832,675, and 6,027,062, the specifications of which are hereby incorporated by reference. In particular, optical fibers 100 can be pulled from a root portion of the optical fiber preform by a tractor within a draw furnace. After leaving the draw furnace, the bare optical fiber encounters a diameter monitor (D) which provides a signal that is used in a feedback control loop to regulate the speed of the tractor to maintain a constant fiber diameter. The bare optical fiber then passes through a fiber tension measurement device (T) that measures the tension of the optical fiber caused by pulling the fiber from the preform. This tension can increase depending on the speed of the fiber draw, the temperature and viscosity of the root of the preform, etc. One example of a fiber tension measurement device is disclosed in European Patent No. EP 0479120 A2, which is incorporated herein by reference. The optical fibers disclosed herein, including fibers 100 can be drawn from such preforms and coated with standard primary and secondary urethane acrylate coatings.

According to certain aspects of the disclosure, the concentration of Ge and/or Cl within the core decreases radially. In some embodiments, the maximum germania weight % in the core is greater than 6 wt %. In other embodiments, the maximum germania weight % in the core is greater than 8 wt %. In still other embodiments, the maximum germania weight % in the core is greater than 10 wt %. In some embodiments, the maximum germania weight % in the core is greater than 6 wt % and less than 14 wt %. According to some embodiments the concentration of Cl in the outer cladding region of the cladding is greater than 0.2 wt %. In other embodiments, the chlorine concentration in the outer cladding is greater than 0.4 wt %. In still other embodiments, the chlorine concentration in the outer cladding region of the cladding is greater than 1.2 wt %. In yet other embodiments, the chlorine concentration in the outer cladding region is greater than 1.5 wt %. In some embodiments, the chlorine concentration in the outer cladding region is greater than 0.2 wt % and less than 2.5 wt %.

The composition of the cladding can also be important in achieving the desired low bending loss properties and, as described above, the first cladding region may be doped with fluorine to lower the refractive index to be lower than the refractive index of the core. In certain aspects of the optical fibers, the low relative refractive index of a first cladding region within the cladding (e.g., achieved through fluorine doping) can be at least 0.025% less than the maximum relative refractive index of the outer cladding region. Similarly, in some embodiments, the relative refractive index difference between the first cladding region and the outer cladding region can be between 0.02% and 0.25%, for example between 0.04% and 0.2%. In some embodiments, the relative refractive index difference of the first cladding region and the outer cladding (43) can be between 0.05% and 0.2%, for example between 0.12% and 0.2%.

The composition of the cladding can also be important in achieving the desired low bending loss properties and, as described above, the first cladding region may be doped with fluorine to lower the refractive index to be lower than the refractive index of the core. In certain aspects of the optical fibers, the maximum relative refractive index of a core can be at least 0.25% greater than the maximum relative refractive index of the outer cladding. Similarly, in some embodiments, the maximum relative refractive index difference between the core region and the outer cladding region can be between 0.25% and 0.65%, for example between 0.3% and 0.6% or between 0.3% and 0.65%. In some embodiments, the maximum relative refractive index difference of the core region and the outer cladding (43) can be between 0.35% and 0.55%, for example between 0.4% and 0.5%.

Optionally, $B_2O_3$ can be employed as dopants in the cladding alone, or as additions to a fluorine dopant already present in the cladding.

In some embodiments of the optical fiber designs in this disclosure, the core and cladding can be configured to minimize or eliminate the presence of other alkali elements (e.g., potassium). Comparatively, alkali doping is more expensive than doping processes used for other dopants (e.g., fluorine doping). Accordingly alkali-free optical fiber designs disclosed herein are particularly optimized to reduce processing and manufacturing costs.

FIG. 1 depicts the relative refractive index profile as a function of fiber radius for an exemplary embodiment of optical fibers 100 and, respectively, according to aspects of this disclosure. This relative refractive index profile is plotted relative to the first cladding region (i.e., relative to the refractive index delta $\Delta_{2MIN}$%). The exemplary optical fiber 100 is single mode (SM) at 1550 nm.

Figure 2:
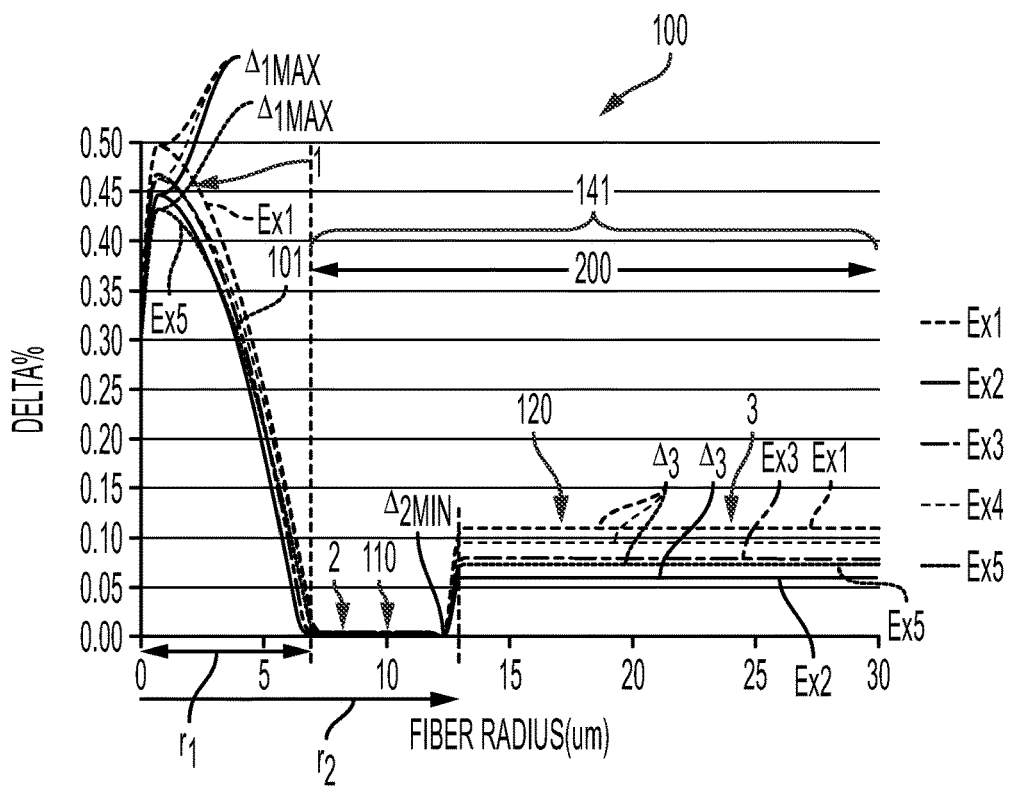
FIG. 2 is a schematic diagram that depicts relative refractive index as a function of fiber radius for five exemplary optical fiber embodiments described herein.

As shown in FIG. 1 and FIG. 2, optical fiber 100 possesses a core 101. The core 101 can have an alpha profile with a value from about 10 or larger to form a step relative refractive index profile 1. Preferably, core 101 exhibits an alpha profile with a value of greater than 12, or greater than 15, between 15 and 100, for example at least 20, or for example between 15 and 30. The relative refractive index $\Delta_1$ of the core 101 has a maximum relative refractive index $\Delta_{1MAX}$. The core 101 has an outer core radius $r_1$. According to some embodiments, the core 101, from its center to its radius $r_1$ primarily contains $SiO_2$ doped Ge and/or Cl. Optionally, the core 101 may be additionally doped with $K_2O$, and/or $P_2O_5$. These dopants may be introduced into the $SiO_2$ core 101 by OVD, VAD, MCVD, and PCVD processing methods.

Further, the core 101 of fibers 100 may have a peak relative refractive index delta $\Delta_{1max}$ of about 0.2% $\Delta$ to about +0.65%, (e.g., 0.3 to 0.5%) relative to the outer cladding region. The peak (maximum) relative refractive index delta of the core, $\Delta_{1max}$, may also range from about from about +0.25% to 0.45% (relative to the outer cladding). In addition, the core 101 of fibers 100 is configured for single mode operation, and can have a core radius $r_1$ of about 4.75. to 6.25 microns. The effective area, $A_{eff}$, of core 101 at 1310 nm can range from about 55 μm² to about 90 μm² (for example, between 60 μm² to 70 μm²). The effective area, $A_{eff}$, of core 101 at 1550 nm can range from about 60 μm² to about 110 μm² (for example, between 75 μm² to 85 μm²).

Optical fibers 100 have a cladding 141 that includes two cladding regions. The two cladding regions may primarily contain $SiO_2$ doped with F, with an outer cladding region having a smaller amount of than the first cladding region cladding region. Optionally, Cl and/or $B_2O_3$ can be employed as dopants in the various cladding regions in addition to the F dopant. Alternatively, as described above, the outer cladding region may be primarily contain $SiO_2$ (i.e., it can be without F).

Referring again to FIG. 1, optical fiber 100 possesses a cladding 141 with a thickness 200. The cladding 141 comprises at a first cladding region 110 in contact with and surrounding the core 101 and an outer cladding region 120 surrounding the first cladding region 110. The first cladding region 110 is a depressed index cladding region (also referred to as a moat herein) with a relative refractive index profile 2 (which comprises $\Delta_{2min}$). The first cladding region 110 has and an inner radius $r_1$ and outer radius $r_2$. The outer cladding region 120 has a relative refractive index profile 3, an inner radius $r_2$ and an outer radius $r_3$.

According to some embodiments the first cladding region comprises moat volume $V_2$, wherein 5% micron²<$V_2$<60% micron². According to some embodiments the first cladding region comprises moat volume $V_2$, wherein 5% micron²<$V_2$<40% micron². According to some embodiments the first cladding region comprises moat volume $V_2$, wherein 5% micron²<$V_2$<30% micron². According to some embodiments κ% micron²<$V_2$<20% micron². According to some embodiments 7% micron²<$V_2$<20% micron².

In some embodiments relative refractive index 3 (corresponding to $\Delta_3$) of the outer cladding 120 is preferably substantially constant out to the outer radius $r_3$. In some embodiments the relative refractive index of the cladding 141 has a step-shaped profile.

Each of these cladding regions 110, 120, surrounds the core 101. As depicted in FIG. 1, the first cladding region 110 (i.e., the depressed index cladding region) has a relative refractive index profile 2 with a lower refractive index delta than the relative refractive index profile 3 of the outer cladding region 120. Together, these cladding regions possess a total thickness 200, corresponding to the thickness of the cladding 141. The relative refractive index profiles 2 and 3 in cladding 141 each may possess a step-shaped profile. The total thickness 200 of the cladding 141 is $r_3-r_1$.

As also shown in FIG. 1, the relative refractive index profile 2 of the first cladding region 110 may have a relative refractive index value approximately equal to $\Delta_2$ min. In FIG. 1, the relative refractive index profile 2 of the first cladding region 110 exhibits a moat of width $m_1$ ($m_1=r_2-r_1$) such that its relative refractive index ($\Delta_2$) is lower than the relative refractive index of the core 101 and the relative refractive index ($\Delta_3$) of the next outer cladding region 120, which corresponds to the relative refractive index profile 3. As shown in FIG. 1, the first cladding region 110 with a relative refractive index profile 2 extends to a radius to as $r_2$. It is noted that Br, and/or F and/or Cl, or combinations thereof, may be included as refractive index altering dopants in the first cladding region 110 to facilitate the creation of the moat of width $m_1$ with respect to outer cladding region 120. The relative refractive index profile 3 of the outer cladding 120 (comprising $\Delta_3$) is preferably substantially constant out to its outer radius $r_3$.

The optical fibers 100 configured for single mode operation possess relatively low attenuation, less than about 0.19 dB/km, less than about 0.185 dB/km, or not greater than 0.18 dB/km at a wavelength 1550 nm. Fibers 100 are configured for single mode operation at 1550 nm and are particularly suited for coupling to fibers suitable for G.652 and G.654 optical fiber applications. Such optical fiber embodiments 100 may, for example, exhibit a cable cutoff less than 1300 nm, more preferably less than 1225 nm (for example between 1190 nm and 1210 nm), and a zero dispersion wavelength less than 1306 nm. For example, in some embodiments the optical fibers comprise a zero dispersion wavelength that is less than 1303 nm. For example, in some embodiments the optical fibers comprise a zero dispersion wavelength situated between 1295 nm and 1306 nm, or between 1297 nm and 1306 nm.

The optical fibers 100 configured for single mode operation and described herein can advantageously have uncharacteristically low bend loss. As used herein, "bend loss" refers to a macrobend loss value for the optical fibers, as measured at 1550 nm in units of dB/turn. In some embodiments, optical fiber 100 can have a macrobend loss of less than 0.002 dB/turn on a 30 mm mandrel and less than <0.2 dB/turn on a 20 mm mandrel. According to some embodiments the optical fibers exhibit macrobend losses of less than 0.001 dB/turn on a 30 mm mandrel; and less than <0.15 dB/turn on a 20 mm mandrel. According to some embodiments the optical fibers exhibit macrobend losses of less than 0.001 dB/turn on a 30 mm mandrel; and less than <0.12 dB/turn on a 20 mm mandrel. According to some embodiments the optical fibers exhibit macrobend losses of between 0.0001 dB/turn and 0.001 dB/turn when the optical fiber is bent around a 30 mm mandrel; and between 0.05 dB/turn and 0.12 dB/turn when the fiber is bent around a 20 mm mandrel.

Although the cores 101 of the fibers 100 disclosed herein may optionally contain some level of alkali, the embodiments disclosed herein may employ cores which are substantially free of alkali, and in many embodiments the cores preferably contain no alkali.

The fibers also include a cladding 141 in the fiber that surrounds the core 101. Further, the core 101 as depicted in FIG. 1 and FIG. 2 has a step refractive index profile having an alpha of greater than 10 (e.g., between 10 and 100). In addition, as discussed above, the cladding 141 includes a first cladding region which is a depressed index region (also referred herein as a moat) having a relative refractive index that is substantially constant and lower than a relative refractive index of the of the outer cladding region (with the outer cladding region having the relative refractive index profile $\Delta_4$ depicted in FIG. 1 and FIG. 2).

EXAMPLES

Various embodiments of the foregoing fibers will be further clarified by the following examples of modeled fibers. It will be apparent to those skilled in the art that various modifications and variations can be made without departing from the spirit or scope of the present disclosure. All of the examples listed below have an outer cladding radius of 62.5 microns, and a fiber cladding diameter of 125 microns. Further, all optical parameters provided for the fibers modeled below are at 1550 nm and the LP01 mode, unless otherwise stated.

Examples of modeled properties are shown below in Table 1, consistent with one or more of the optical fibers 100 described in the foregoing aspects of the disclosure. More specifically, set forth in Table 1 below are the following parameters and fiber dimensions for five embodiments of exemplary single mode fibers: $\Delta_{1max}$ (%) of the core, core alpha, radius $r_1$ of the core, the outer radius of the first cladding region($r_2$, µm), the cladding outer radius $r_3$ (µm), moat delta $\Delta_{2min}$ (%) (i.e., the minimum relative refractive index of the inner cladding, and in these embodiments $\Delta_{2min}=0$), outer cladding delta $\Delta_3$ (%), 22 meter cable cutoff wavelength (nm), mode field diameter, MFD (µm) at 1310 nm, effective area, Aeff at 1310 nm (µm²), dispersion (ps/nm/km) and dispersion slope (ps/nm²/km) at 1310 nm, zero dispersion wavelength, Lambda zero (nm), mode field diameter, MFD (µm) at 1550 nm, effective area, Aeff at 1550 nm (µm²), dispersion (ps/nm/km) and dispersion slope (ps/nm²/km) at 1550 nm, attenuation at 1310 and 1550 nm (dB/km). Also included in Table 1 are bend loss values at 1550 nm in dB/turn for 20 mm and 30 mm diameter mandrels. The moat volume $V_2$ of the exemplary embodiments shown in Table 1 are between 7% micron² and 20% micron². Larger values of $V_2$ are obtained when the inner cladding contains downdopants, e.g., fluorine.

Finally, the designation "N/A" indicates that the parameter is not applicable to the particular fiber example.

TABLE 1

| Parameter | Ex. 1 | Ex. 2 | Ex. 3 | Ex. 4 | Ex. 5 |
|---|---|---|---|---|---|
| $\Delta_1$ (%) | 0.369 | 0.4 | 0.496 | 0.38 | 0.36 |
| Max amount of GeO$_2$ (wt %) | 6.6 | 7.2 | 8.9 | 6.8 | 6.5 |
| $r_1$ (micron) | 5.02 | 5.25 | 5.775 | 5.35 | 5.34 |
| Core Alpha | 20 | 20 | 20 | 20 | 20 |

TABLE 1-continued

| Parameter | Ex. 1 | Ex. 2 | Ex. 3 | Ex. 4 | Ex. 5 |
|---|---|---|---|---|---|
| $\Delta_2$ (%) | 0 | 0 | 0 | 0 | 0 |
| $r_2$ (micron) | 13.5 | 13.5 | 14.5 | 13.5 | 13.5 |
| First cladding material | $SiO_2$ | $SiO_2$ | $SiO_2$ | $SiO_2$ | $SiO_2$ |
| $V_2$ | 6.282 | 11.602 | 31.842 | 10.754 | 9.224 |
| First cladding region's Alpha | 20 | 20 | 20 | 20 | 20 |
| $\Delta_3$ (%) | 0.04 | 0.075 | 0.18 | 0.18 | 0.18 |
| Max amount of Chlorine in outer cladding region (wt %) | 0.55 | 1.03 | 2.47 | 2.47 | 2.47 |
| r3 (micron) | 62.5 | 62.5 | 62.5 | 62.5 | 62.5 |
| Dispersion at 1310 nm (ps/nm/km) | 1.086 | 1.858 | 3.136 | 1.936 | 1.832 |
| Dispersion Slope at 1310 nm (ps/nm²/km) | 0.087 | 0.089 | 0.091 | 0.089 | 0.088 |
| Dispersion at 1550 nm (ps/nm/km) | 18.105 | 19.088 | 21.005 | 19.208 | 19.084 |
| Dispersion at Slope 1550 nm (ps/nm²/km) | 0.058 | 0.058 | 0.061 | 0.059 | 0.059 |
| MFD at 1310 nm (micron) | 9.2 | 9.2 | 9.2 | 9.44 | 9.60 |
| $A_{eff}$ (micron²) at 1310 nm | 66.5 | 66.5 | 66.5 | 70 | 70.4 |
| MFD at 1550 nm (micron) | 10.29 | 10.17 | 9.95 | 10.42 | 10.63 |
| $A_{eff}$ (micron²) at 1550 nm | 83.2 | 81.2 | 77.8 | 85.3 | 88.7 |
| LLWM @ 1550 nm, dB/m | 0.49 | 0.41 | 0.29 | 0.57 | 0.76 |
| WMCD at 1550 nm, dB/km | 0.05 | 0.05 | 0.05 | 0.05 | 0.05 |
| Pin Array at 1550 nm, dB | 9.96 | 8.59 | 6.04 | 11.27 | 14.42 |
| Lambda 0 (nm) | 1297.6 | 1289.0 | 1275.7 | 1288.2 | 1289.3 |
| Cable Cutoff (nm) | 1190 | 1190 | 1203 | 1196 | 1195 |
| MAC # (MFD at 1310 nm/ Cable Cutoff) | 7.731 | 7.730 | 7.649 | 7.892 | 8.032 |
| 1 × 20 mm bend loss (dB/turn) | 0.235 | 0.133 | 0.022 | 0.245 | 0.260 |
| 1 × 3 mm bend loss (dB/turn) | 0.0035 | 0.0022 | 0.0004 | 0.0042 | 0.0047 |
| Attn at 1550 nm, dB/km | 0.180 | 0.180 | 0.180 | 0.180 | 0.180 |
| Attn at 1310 nm, dB/km | 0.320 | 0.320 | 0.320 | 0.320 | 0.320 |

The exemplary fiber embodiments depicted in Table 1 have optical performances compatible with G.652 recommendations with exception of zero dispersion wavelength, an unusually low bend loss at 30 mm mandrel diameter of less than 0.001 dB/turn dB/turn and zero dispersion wavelength between 1295 nm and 1306 nm. The relative refractive index profile shown in FIG. 1, and disclosed in Table 1 is relative to the minimum refractive index of the first cladding region. The optical properties of the single-moded (SM) optical fibers in Table 1 demonstrate low attenuation, excellent bend performance and other properties compatible with G.657 and G.652 specifications. The optical properties of the single mode fibers described herein demonstrate low attenuation, and an excellent bend performance.

It is to be understood that the foregoing is exemplary only and is intended to provide an overview for the understanding of the nature and character of the fibers which are defined by the claims. The accompanying drawings are included to provide a further understanding of the preferred embodiments and are incorporated and constitute part of the specification. The drawings illustrate various features and embodiments which, together with their description, serve to explain the principals and operation. It will be apparent to those skilled in the art that various modifications and variations can be made to the preferred embodiments as described herein without departing from the spirit or scope of the claims.

What is claimed is:

1. A single mode optical fiber, comprising:
   a silica based core having a step refractive index profile with an alpha of greater than 10, a relative refractive index $\Delta_{1MAX}$, and an outer radius $r_1$, wherein 6.25 microns>$r_1$>4.75 microns, the core further comprising Cl, Ge, or a combination thereof, wherein the maximum weight % of Ge in the core is greater than 6 wt % and less than 14 wt %;
   a first cladding region in contact with and surrounding the core, the first cladding region having a relative refractive index $\Delta_{2MIN}$, an inner radius $r_1$, and an outer radius $r_2$, wherein $r_2$<20 microns, wherein the first cladding region is a depressed index cladding region; and
   an outer cladding region surrounding the first cladding region, the outer cladding region having a relative refractive index $\Delta_3$, wherein the chlorine concentration in the outer cladding is greater than 0.2 wt % and less than 2.5 wt %,
   said fiber having MFD at 1310 nm wavelength greater than 9 microns, a zero dispersion wavelength of less than 1300 nm, a 22 m cable cutoff wavelength of less than 1260 nm; and a bend loss of
   less than 0.005 dB/turn when the optical fiber is bent around a 30 mm diameter mandrel; and
   less than 0.5 dB/turn when the fiber is bent around a 20 mm diameter mandrel.

2. The optical fiber according to claim 1, wherein the bend loss is less than 0.001 dB/turn when the optical fiber is bent around 30 mm diameter mandrel.

3. The optical fiber according to claim 1, wherein the bend loss is less than 0.0005 dB/turn when the optical fiber is bent around 30 mm diameter mandrel.

4. The optical fiber according to claim 1, wherein the bend loss is less than 0.2 dB/turn when the optical fiber is bent around 20 mm diameter mandrel.

5. The optical fiber according to claim 1, wherein the bend loss is less than 0.1 dB/turn when the optical fiber is bent around 20 mm diameter mandrel.

6. The optical fiber according to claim 1, wherein 9 microns<MFD<9.6 microns.

7. The optical fiber according to claim 1, wherein 6 microns>$r_1$>4.9 microns.

8. The optical fiber according to claim 1, wherein 0.2%>$\Delta_3-\Delta_{2MIN}$>0.05%.

9. The optical fiber according to claim 1, wherein 0.2%>$\Delta3-\Delta_{2MIN}$>0.08%.

10. The optical fiber according to claim 1, wherein $r_2$<15 microns.

11. The optical fiber according to claim 1, wherein 6 microns>$r_1$>4.9 microns, $r_2$<15 microns, 0.15%>$\Delta_3-\Delta_{2MIN}$>0.05%, and 9 microns>MFD>9.6 microns.

12. The optical fiber according to claim 1, wherein 12 microns<$r_2$<14 microns.

13. The optical fiber according to claim 1, wherein the relative refractive index difference between the core and the first cladding region is between 0.425% and 0.5%, and 0.15%>$\Delta3-\Delta2MIN$>0.05%.

14. The optical fiber according to claim 10 wherein:
100>alpha>10,
6 microns>$r_1$>4.9 microns,
$r_2$<15 microns,
0.125%>$\Delta_3-\Delta_{2MIN}$>0.05%, and
9.6 microns>MFD>9.0 microns.

15. The optical fiber according to claim 14 wherein the first cladding region comprises moat volume $V_2$, and 5% $\Delta$ micron²<$V_2$<60% $\Delta$ micron².

16. The optical fiber according to claim 14 wherein the first cladding region comprises moat volume $V_2$, and 5% $\Delta$ micron²<$V_2$<20% $\Delta$ micron.

17. The optical fiber according to claim 1 wherein the first cladding region comprises moat volume $V_2$, and 7% $\Delta$ micron²<$V_2$<30% $\Delta$ micron².

18. The optical fiber according to claim 1 wherein the first cladding region comprises moat volume $V_2$, and 7% $\Delta$ micron²<$V_2$<20% $\Delta$ micron².

19. The optical fiber according to claim 1, wherein the optical fiber exhibits macrobend losses of:
(i) less than 0.002 dB/turn when the optical fiber is bent around a 30 mm mandrel, and
(ii) less than <0.2 dB/turn when the fiber is bent around a 20 mm mandrel.

20. The optical fiber according to claim 1, wherein the optical fiber exhibits macrobend losses of:
(i) less than less than 0.001 dB/turn when the optical fiber is bent around a 30 mm diameter mandrel; and
(ii) less than <0.15 dB/turn when the fiber is bent around a 20 mm diameter mandrel.

21. The optical fiber according to claim 1, wherein the optical fiber exhibits macrobend losses of:
(i) less than 0.001 dB/turn when the optical fiber is bent around a 30 mm diameter mandrel; and
(ii) less than <0.12 dB/turn when the fiber is bent around a 20 mm diameter mandrel.

22. The fiber according to claim 1, wherein the relative refractive index difference between the core and the outer cladding region is between 0.3% and 0.65%.

* * * * *

UNITED STATES PATENT AND TRADEMARK OFFICE
CERTIFICATE OF CORRECTION

PATENT NO. : 11,067,744 B2
APPLICATION NO. : 16/193919
DATED : July 20, 2021
INVENTOR(S) : Scott Robertson Bickham et al.

It is certified that error appears in the above-identified patent and that said Letters Patent is hereby corrected as shown below:

On the Title Page

In Column 2, item (57), Abstract, Line 12, delete "22m" and insert -- 22 m --, therefor.

In the Claims

In Column 12, Line 32, Claim 1, delete ">r$_1$>4.75" and insert -- >r$_1$≥4.75 --, therefor.

In Column 13, Line 2, Claim 7, delete ">r$_1$>4.9" and insert -- >r$_1$≥4.9 --, therefor.

In Column 13, Line 4, Claim 8, delete "0.2%>Δ$_3$-Δ$_{2MIN}$>0.05%." and insert
-- 0.2%≥Δ$_3$-Δ$_{2MIN}$≥0.05%. --, therefor.

In Column 13, Line 6, Claim 9, delete "0.2%>Δ$_3$-Δ$_{2MIN}$>0.08%." and insert
-- 0.2%≥Δ$_3$-Δ$_{2MIN}$≥0.08%. --, therefor.

In Column 13, Line 10, Claim 11, delete ">r$_1$>4.9" and insert -- >r$_1$≥4.9 --, therefor.

In Column 13, Lines 10-11, Claim 11, delete "0.15%>Δ$_3$-Δ$_{2MIN}$>0.05%," and insert
-- 0.15%≥Δ$_3$-Δ$_{2MIN}$≥0.05%, --, therefor.

In Column 13, Line 13, Claim 12, delete "<r$_2$<14" and insert -- ≤r$_2$≤14 --, therefor.

In Column 13, Line 17, Claim 13, delete "0.15%>Δ3 -Δ2MIN>0.05%." and insert
-- 0.15%≥Δ$_3$-Δ$_{2MIN}$≥0.05%. --, therefor.

In Column 13, Line 20, Claim 14, delete ">r$_1$>4.9" and insert -- >r$_1$≥4.9 --, therefor.

In Column 13, Line 22, Claim 14, delete "0.125%>Δ$_3$-Δ$_{2MIN}$>0.05%," and insert
-- 0.125%≥Δ$_3$-Δ$_{2MIN}$≥0.05%, --, therefor.

Signed and Sealed this
Eighth Day of August, 2023

Katherine Kelly Vidal
*Director of the United States Patent and Trademark Office*

CERTIFICATE OF CORRECTION (continued)
U.S. Pat. No. 11,067,744 B2

In Column 14, Line 12, Claim 19, delete "<0.2" and insert -- 0.2 --, therefor.

In Column 14, Line 16, Claim 20, delete "less than less than" and insert -- less than --, therefor.

In Column 14, Line 18, Claim 20, delete "<0.15" and insert -- 0.15 --, therefor.

In Column 14, Line 24, Claim 21, delete "<0.12" and insert -- 0.12 --, therefor.

In Column 14, Line 26, Claim 22, delete "fiber" and insert -- optical fiber --, therefor.